United States Patent
Hopkins et al.

(10) Patent No.: US 7,942,591 B2
(45) Date of Patent: May 17, 2011

(54) BEND LIMITING BOOT

(75) Inventors: Eric James Hopkins, Liverpool, PA (US); Robert Carl Briggs, Palmyra, PA (US); Stephen James Miller, Dauphin, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/419,655

(22) Filed: Apr. 7, 2009

(65) Prior Publication Data

US 2010/0254663 A1 Oct. 7, 2010

(51) Int. Cl.
  *G02B 6/38* (2006.01)
(52) U.S. Cl. .......................................................... 385/86
(58) Field of Classification Search .................. 385/86
  See application file for complete search history.

(56) References Cited

U.S. PATENT DOCUMENTS

| 5,347,603 | A | 9/1994 | Belenkiy et al. |
| 5,390,272 | A | 2/1995 | Repta et al. |
| 5,781,681 | A | 7/1998 | Manning |
| 5,915,056 | A | 6/1999 | Bradley et al. |
| 2006/0002662 | A1 | 1/2006 | Manning et al. |
| 2006/0280408 | A1 | 12/2006 | Anderson et al. |
| 2007/0292084 | A1 | 12/2007 | Gurreri et al. |
| 2008/0025670 | A1 | 1/2008 | Castagna et al. |

FOREIGN PATENT DOCUMENTS

WO  WO 2006/052420  5/2006

OTHER PUBLICATIONS

European Search Report, International Application No. EP 10 15 8934, International Filing Date, Jul. 20, 2010.

*Primary Examiner* — Jerry T Rahll

(57) ABSTRACT

A connector having a front and back orientation and comprising: (a) a cable having at least a jacket and an optical fiber; (b) a ferrule assembly comprising a rear portion for attachment to said jacket, and a ferrule defining a bore hole for containing said optical fiber; (c) a housing having a front portion configured for mating with a mating structure and a back portion configured for attachment to a boot; (d) a spring biasing said ferrule assembly forward in said housing; and (e) a boot secured to said back portion of said housing and extending rearward around said tight-jacketed cable, said boot having an internal channel large enough to allow axial movement of said ferrule assembly relative to said boot.

18 Claims, 3 Drawing Sheets

BEND LIMITING BOOT

FIELD OF INVENTION

The present invention relates generally to bend limiting boots for optical connectors and, more specifically, to bend limiting boots for non-pull proof connectors.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to optically couple a fiber with an optical pathway of a mating device (e.g., another fiber, an active device or a passive device) by holding the end of the fiber, typically in a ferrule, such that the core of the fiber is axially aligned with the optical pathway of the mating device.

Optical connectors may be classified as either pull-proof or non-pull proof. In a pull-proof connector, the cable's jacket (and its strength members, if any) is secured to the housing of the connector. Accordingly, if a tensile load is applied to the cable, the load will be transferred from the cable's jacket to the housing. The load is therefore not transferred to the ferrule assembly within the housing. Accordingly, after the connector is mated, the ferrule assembly will not be affected (i.e., drawn back) by a tensile load applied to the cable, and thus the fiber in the ferrule will continue to make contact with the optical pathway of the mating device. On the other hand, in a non-pull proof connector, the cable jacket is secured to the rear portion of the ferrule assembly. Accordingly, when a tensile load is applied to the cable, the load on the jacket is transferred to the rear portion and thus directly to the ferrule assembly, which slides or "floats" within the housing.

Although pull-proof connectors are generally preferred because of their resilience to tensile loads applied to the cable, non-proof connectors are preferred when using tight-jacketed cable. Tight-jacketed optical fiber cable (herein tight-jacketed cable) is well known and comprises an optical fiber adhered to a surrounding, tough polymer jacket. Unlike typical buffered cable, the fiber in a tight-jacketed cable is not free to move within its protective covering. Because a tight-jacketed cable does not allow the optical fiber to move independently of the jacket, it has been recognized that the jacket and the fiber should be anchored to a common component in the connector such that there is no relevant movement between the fiber and the jacket. Accordingly, both the fiber and the jacket are anchored to the ferrule assembly in non-pull proof connectors. (See, e.g., US Patent Application Publication No. 20070292084 for details.)

Another component of a conventional optical connector is a boot for limiting bending of the fiber. By way of background, in routing either cables or single fibers, it is imperative for reliable signal transmission that sharp bends in the fibers be avoided. A sharp bend (i.e., small radius) in a fiber can lead to signal loss by virtue of at least some of the transmitted light leaking out of the fiber at the bend. A sharp bend can also cause further signal degradation if the bend introduces microcracks in the fiber, which reduce or impair the uninterrupted guiding of the optical signals. An excessively sharp bend may even cause fiber breakage.

To prevent excessive bending, bend-limiting boots, or simply boots, are used. For example, referring to FIG. 3, a prior art LC type, non-pull proof connector 300 is shown comprising a boot 304, which is elongated and exteriorly tapered, and has bend-limiting segments separated from each other by gaps 315. The boot extends from the rear portion 301a of the ferrule assembly 301 and defines an internal channel 313 through which the cable passes. The boot slips over the rear portion 301a of the ferrule assembly 301 of the connector, and protects the cable from excessive bending at the region where it enters the connector. Specifically, when the cable is bent, the segment portions on the inside of the bend are forced toward each other until they touch, thereby preventing further bending. Properly designed, the boot prevents the cable from approaching the critical bend radius for the fiber or fibers therein.

Although connector 300 has performed well over the years, recently, Applicants have recognized a trend that connectors used with active components and in backplane applications have a disproportionately high failure rate, especially when used in high-density applications. These failures are caused, in general, by damaged optical components within the mating devices. Noteworthy is the fact that this high failure rate is associated with mating devices having "fixed" optical interfaces, such as fixed ferrules used in transceivers and backplane connectors.

Applicants surmised that these failures occur more frequently in high-density connector applications because installers use the boot to push the connector forward to effect mating. That is, in such high density applications, there is insufficient room around the connector for an installer to grasp the housing and push it forward such that the connector engages and mates with the mating device. Instead, the installer typically uses the boot, which extends rearwardly from the connector, to force the connector forward. Because the boot is typically secured to the ferrule assembly in a conventional non-pull proof connector, the forward force applied to boot is transferred to the ferrule assembly. This force can be many times higher than the normal biasing force applied to the ferrule assembly by virtue of the spring, which is engineered to provide the proper mating force. Accordingly, pushing the connector forward into a mating device having a fixed optical interface may result in much higher than expected mating force because the optical components of the fixed optical interface cannot "backup" in response to higher than expected mating forces. The pressure between the ferrule assembly and these optical components can increase significantly, possibly resulting in damage to either the connector, the mating structure, or both.

In addition to causing damage to the optical components, Applicants also recognize that using the boot to push a non-pull proof connector forward to mate tends to be ineffective. Specifically, referring back to FIG. 3, when pushing the boot forward to mate the connector, the ferrule 303 of the connector stops against the fixed optical interface of the mating device before the housing 302 engages and mates with the mating device (not shown). Because the boot 304 is attached to the ferrule assembly 301 and not the housing 302, once the ferrule abuts the fixed optical interface, pushing the boot does nothing to advance the housing forward. Additionally, because the ferrule assembly 301 is biased forward in the housing 302, this biasing actually urges the housing backward away from the mating device, thereby making contact between the housing 302 and the mating device even more difficult.

A need therefore exists for a non-pull proof connector having a boot that is configured to allow the user to mate the connector by pushing the boot forward. The present invention fulfills this need among others.

SUMMARY OF INVENTION

The present invention provides a non-pull proof connector having a boot configured to allow the user to mate the connector by pushing the boot forward. More specifically, rather than securing the boot to the ferrule assembly, the connector is configured such that the boot secures to the housing. Because the boot is secured to the housing, any forward force applied to the boot is transferred to the housing and not to the ferrule assembly. Furthermore, the boot is sized to allow the backward movement of the ferrule assembly relative to the boot. Accordingly, as the connector housing is pushed forward with the boot, the ferrule assembly is free to move backward relative to the boot such that delicate optical components are not damaged during mating.

One aspect of the invention is a non-pull proof connector having a boot secured to the housing to allow the user to mate the connector by pushing the boot forward. In one embodiment, the connector has a front and back orientation and comprises: (a) a cable having at least a jacket and an optical fiber; (b) a ferrule assembly comprising a rear portion for attachment to the jacket, and a ferrule defining a bore hole for containing the optical fiber; (c) a housing having a front portion configured for mating with a mating structure and a back portion configured for attachment to a boot; (d) a spring biasing the ferrule assembly forward in the housing; and (e) the boot secured to the back portion of the housing and extending rearward around the cable, the boot having an internal channel large enough to allow axial movement of the ferrule assembly relative to the boot.

DETAILED DESCRIPTION

Figure 1:
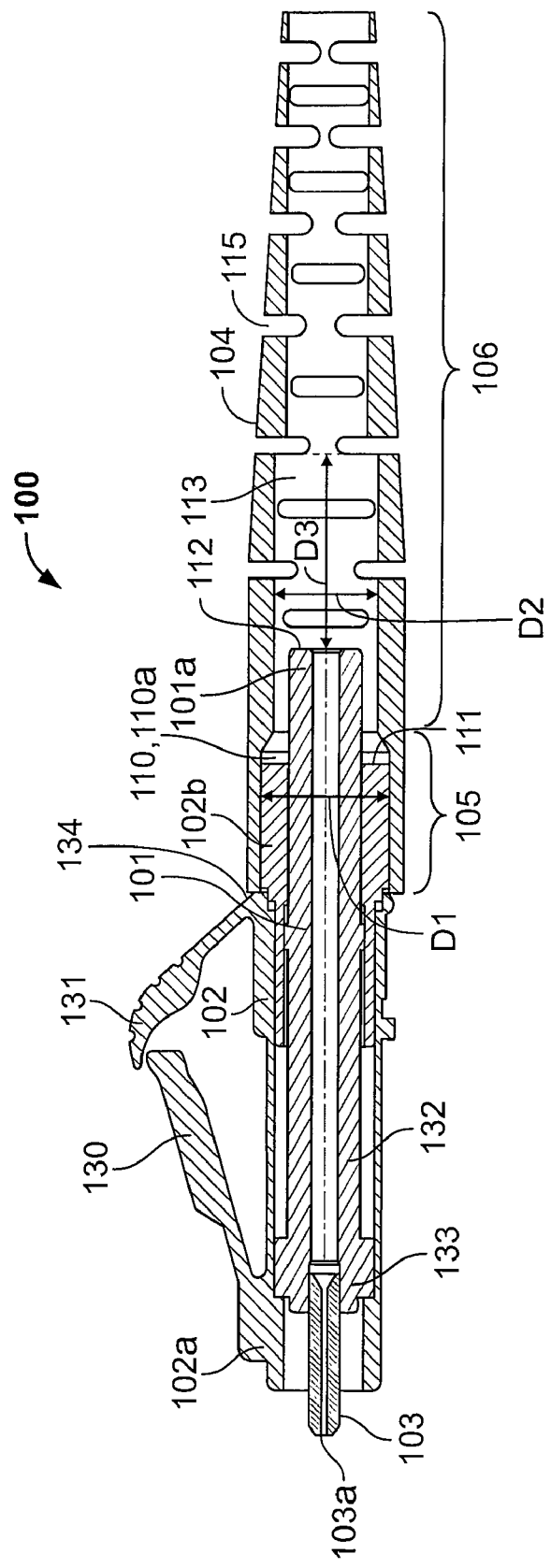
FIG. 1 shows one embodiment of the connector of the present invention.
Figure 2:
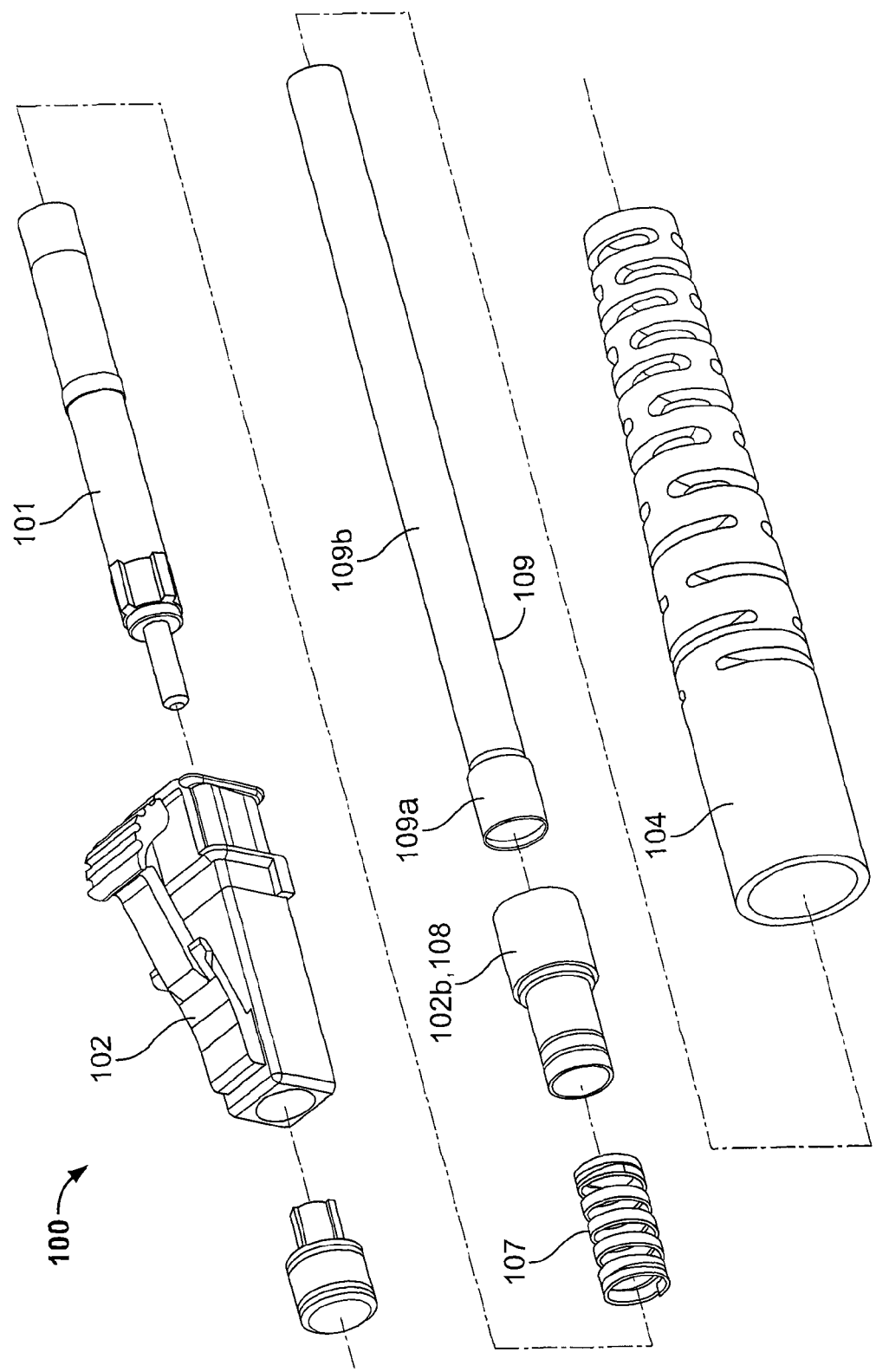
FIG. 2 shows an exploded view of the connector in FIG. 1.
Figure 3:
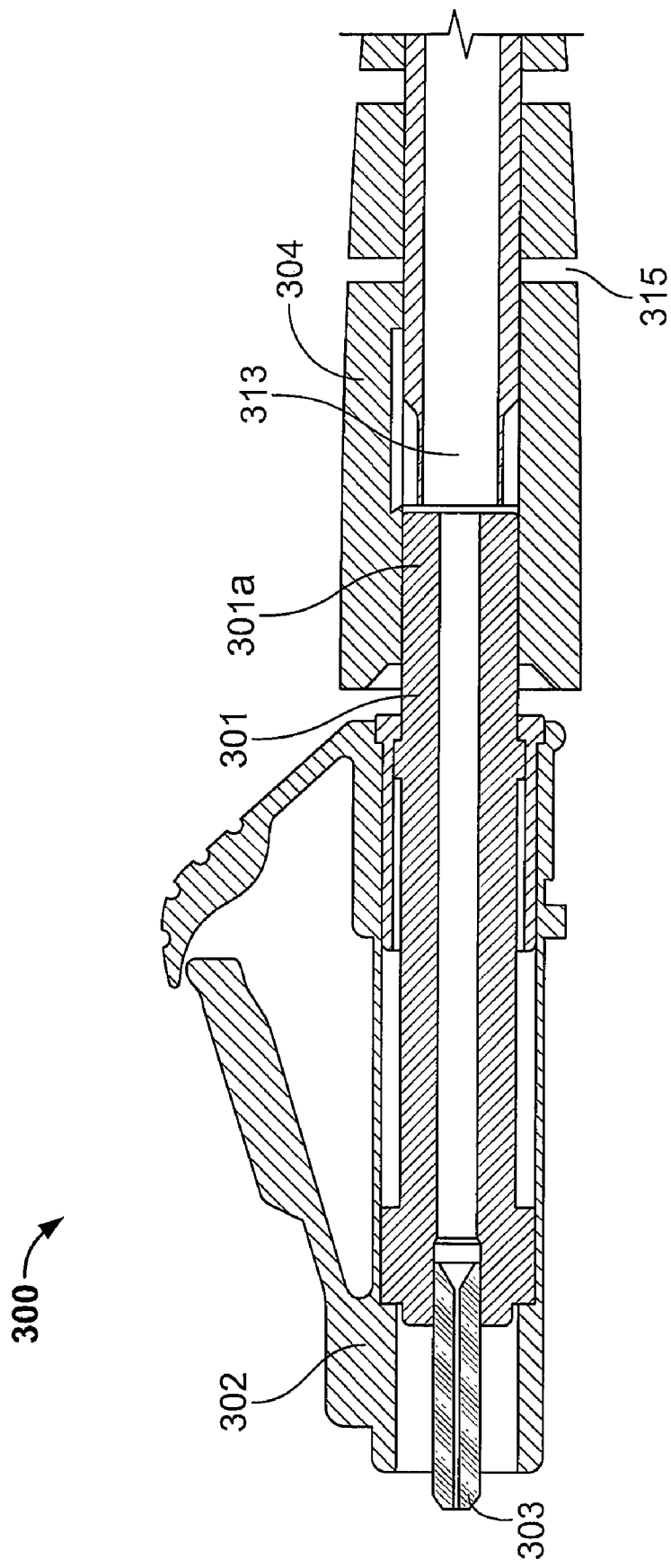
FIG. 3 shows a prior art connector.

Referring to FIGS. 1 and 2, one embodiment of a connector 100 of the present invention is shown. As shown, the connector 100 has a front and back orientation and comprises the following: (a) a cable (not shown) having at least a jacket and an optical fiber; (b) a ferrule assembly 101 comprising a rear portion 101a for attachment to the jacket, and a ferrule 103 defining a bore hole 103a for holding the fiber; (c) a housing 102 having a front portion 102a configured for mating with a mating structure and a back portion 102b configured for attachment to a boot 104; (d) a spring 107 biasing the ferrule assembly 101 forward in the housing 102; and (e) the boot 104 secured to the back portion of the housing 102 and extending rearward around the cable, the boot having an internal channel 113 large enough to allow for relative movement of the ferrule assembly 101.

The particular connector disclosed in FIGS. 1 and 2 is a non-pull proof, LC-type connector, which is a small form factor connector. It should be understood, however, that the invention is not restricted to LC-type connectors, or even small form factor connectors, and may be practiced using any standard non-pull proof connector configuration, including, for example, LC and SC type connectors, or, even any standard connector in general including, for example, MU, MT-RJ, MPX, MPO, etc. Furthermore, the design features of such connectors, such as their outside housing geometries, mating configurations, latching mechanisms, and ferrule assembly biasing, are well known and will not be specifically addressed herein. Furthermore, although non-pull proof connectors are typically used with tight-jacketed cable, the cable need not be tight jacketed to practice the invention.

In one embodiment, the boot serves a dual role. First, it functions in its traditional capacity to limit the bending of the cable to preserve the light transmittance performance of the optical fiber contained in the cable. It also functions as a convenient point for a user to grip the connector and push it forward for mating to a mating device such as an adapter, backplane connector, or active device. The latter functionality is provided by virtue of the boot being secured to the housing, rather than the ferrule assembly (as is the conventional approach), and being configured to allow the ferrule assembly to move axially relative to the boot. Specifically, because the boot 104 is secured to the housing 102, rather than the ferrule assembly 101, any forward axial force applied to the boot is translated to the housing 102. This design avoids the prior art problem of force applied to the boot being transferred to the ferrule assembly 101 and eventually into the ferrule 103, which is delicate and can fracture or cause damage to the optical pathway of the mating device as described above.

The boot may be secured to the housing in a variety of ways. In one embodiment, the boot 104 defines a first portion 105 and a second portion 106. The first portion 105 has a first diameter D1, while the second portion 106 is behind the first portion 105 and has a second diameter D2 smaller than the first diameter. The function of the second portion 106 is described in detail below with respect to allowing movement of the ferrule assembly. The first diameter D1 is sized such that the first portion wraps snugly around the back portion 102b of the housing 102. Thus, the first portion secures the boot to the housing. To enhance the grip of the boot to the back portion 102b, the first portion may have barbs, ridges, or other known structured for enhancing grip. Alternatively or additionally, the back portion 102b may be contoured with ridges/barbs or textured to enhance its grip with the boot.

Additionally or alternatively, the boot 104 may be configured to urge against a structural component 134 of the housing such that when axial force is applied to the boot, it is transferred to the housing 102 partially or totally via the structural component 134. The structural component may be any feature against which the boot can urge. For example, it may be a protrusion such as a bump or ridge. In one embodiment, the latch 131 (described below) of the connector 100 is used as a protrusion against which the boot 104 urges.

Additionally or alternatively, the boot may be configured to mechanically engage the housing. For example, the boot may have an inwardly extending ridge 110 that contacts the housing to transfer force from the boot to the housing. For example, in one embodiment, the boot comprises a shoulder 110a between the first portion 105 and a second portion 106 that contacts the back face 111 of the back portion 102b. Thus, when axial forward force is applied to the boot 104, the shoulder 110a transfers the force through the back face 111 and into the housing 102. Still other mechanisms for transferring force from the boot to the housing will be obvious to one of skill in the art in light of this disclosure. Further, it should be appreciated that any combination of the features used to transfer force from the boot to the housing may be used. In one embodiment, a multitude of features are used as shown in the embodiment of FIG. 1.

The boot 104 is configured not only to secure to the housing but also to allow for the relative axial movement of the ferrule assembly 101. Allowing for the relative movement of the ferrule assembly is important when mating the connector with an adapter or other mating device, such as a transceiver. Specifically, if the boot is being used to push the connector forward to effect mating, the ferrule assembly needs to be able to slide backward relative to the boot once it makes contact with the optical pathway of the mating device. Otherwise, the ferrule would be pushed hard against the mating component, beyond expected physical contact forces, thereby possibly causing damage to the ferrule or to the optical pathway of the mating device.

Because the cable and crimp eyelet portion 109a are secured to the ferrule assembly as described below in detail, the combination of the ferrule assembly, crimp eyelet, and cable must be able to move axially within the boot with relatively little force. Specifically, the force should less than the spring constant of the spring, this way, the force urging the ferrule forward is essentially just the spring force, which is engineered to provide sufficient physical contact but is not high enough to damage delicate optical components. For example, with an LC-type connector the spring force is about 5 to 6N. Therefore, in a LC-type connector, the ferrule assembly, crimp eyelet and cable should be able to slide within the boot with a force less than this.

The boot may facilitate relative movement of the combination of the ferrule assembly, crimp member and cable in different ways. In one embodiment, the second portion loosely encircles the rear portion 101a of the ferrule assembly and the crimp member 109. Specifically, in this embodiment, the second portion has a second diameter D2, which is greater than the total diameter of the rear portion 101a with the crimp eyelet portion 109a securing the jacket of the cable to it. For an LC type connector, this diameter is about 3.7 mm. Therefore, the second diameter D2 for this embodiment is greater than 3.7 mm, which allows the ferrule assembly/crimp member to move within the boot.

To ensure that the ferrule assembly has sufficient space to move backward during mating, the second portion extends rearward beyond a back face 112 of the rear portion 101a at least a certain distance D3 when the connector is in an unmated state. D3 is about the maximum distance the ferrule assembly 101 can be pushed backward from its unmated state until the spring 107 is fully compressed. For example, in an LC-type connector, D3 is about 1.6 mm. Because the second portion of the boot extends backward at least this distance, the boot is able to receive the rear portion 101a with the crimp eyelet portion 109a crimped thereto when the ferrule assembly is pushed rearward relative to the housing during mating. In one embodiment, as shown in FIG. 2, the second portion extends from the first portion to the back end of the boot.

If the second portion does not extend all the way to the back end of the boot, the internal channel 113 should nevertheless remain sufficiently wide to accommodate the crimp member. Specifically, because the sheath portion 109b of the crimp member 109 extends rearward from the end portion 101a of the ferrule assembly, the diameter of the portion of the boot beyond D3 should be greater than the diameter of the crimp member to allow it to slide within the boot. For example, in an LC type connector, the sheath portion 109b of the crimp member 109 has a diameter of about 2.75 mm. Accordingly, in one embodiment, the boot for an LC type connector has a minimum inside diameter greater than about 2.75 mm. In one embodiment, the inside diameter is no less than about 3 mm, and, in a particular embodiment, the inside diameter is no less than about 3.28 mm.

As mentioned above, the boot also functions in a traditional fashion to maintain the minimum bend radius of the cable. Different ways to control bend radius are well know in the art. For example, in the embodiment shown in FIGS. 1 and 2, the boot has gaps 115 that are configured to ensure a minimum bend radius as described above. In one embodiment, the first portion of the boot is configured to facilitate easy griping. To this end, in one embodiment, the first portion is stiffer than the second portion. Different approaches may be used to increase the stiffness of the first portion, or, conversely, increase the flexibility of the second portion. For example, different materials may be used, wall thickness of the first and second portion can vary, the spacing of the gaps 115 can vary, or combinations of these. In one embodiment, the first portion is essentially solid, and the gaps 115 of the boot are defined only in the second portion as shown in FIG. 1.

The housing of the connector 100 preferably meets industry standards for form factor and mating features such as latches and front face geometry. In the embodiment shown in FIG. 1, the housing comprises different portions—a front portion 102a and a rear portion 102b. In an LC-type connector the portions may be discrete, in which case the rear portion 102b is referred to as the rear body 108. The rear body is snapped or otherwise attached to the back of the front portion 102a of the housing 102, thereby providing a back stop for the spring and purchase point for the boot as described above. The front portion 102a of the LC-type connector shown in FIG. 1 includes latches 130 and 131. Latch 131 is also referred to as a snag protector. Although the housing 102 is shown in FIG. 1 as having discrete portions, it may also be integrally-molded.

Referring now to the ferrule assembly 101 in the embodiment shown in FIG. 1, it comprises the ferrule 103, and a ferrule holder 132 for holding the ferrule 103. The ferrule holder 132 also defines a collar 133 against which the spring 107 urges to push the ferrule assembly 101 forward. In an alternative embodiment, the ferrule assembly may also comprise a clamping mechanism (not shown) as described for example in US Patent Application Publication No. 20060002662, incorporated herein by reference.

As mentioned above, the ferrule assembly 101 is configured for attachment to the jacket of a cable. Unlike a pull-proof connector in which the connector is secured to the jacket at its housing such that any loads on the cable are transferred to the housing, with connector 100, the jacket is secured to the rear portion 101a of the ferrule assembly. Because the cable is secured to the ferrule assembly 101, any movement of the cable results in movement of the ferrule assembly. Consequently, when a fiber is terminated in the ferrule assembly, there is no relative movement between the ferrule and the jacket—the two move as one.

To facilitate the attachment of the jacket to the ferrule assembly 101, the connector 100 is slightly modified from a conventional connector. Specifically, the end portion 102b of the housing does not have a purchase point for the jacket, but rather ends to expose the rear portion 101a of the ferrule assembly 101, enabling it to be used instead as a purchase point for the jacket. In one embodiment, the rear portion 101a is modified in one or more ways to make it suitable for attachment to the cable's jacket. For example, its wall may be thicker than that of conventional ferrule assembly. A more robust ferrule assembly 101 is preferable to handle the tensile and lateral loads that are likely to be imparted by the jacket (not shown) on the connector. The rear portion 101a should also have sufficient length (or area) to enable a crimp eyelet portion 109a (see FIG. 2) to secure the jacket and possibly strength members thereto. The rear portion 101a may also be textured to enhance its grip with the jacket.

The crimp member 109 (FIG. 2) serves both to secure the jacket to the ferrule assembly 101 of connector 100 and to protect the cable. Specifically, after the jacket (and possibly the strength members) is disposed over the rear portion 101a, the crimp eyelet portion 109a of the crimp member 109 is disposed over the rear portion 101a and is crimped to secure the jacket (and possibility the strength member) to the end portion 101a. The sheath portion 109b is then treated with heat such that it wraps tightly around the cable. This way, the ferrule assembly and cable are securely connected. Using a crimp eyelet and sheath portion as described above is a common and well known technique for securing a cable to a connector (although in pull proof connectors the jacket is connected to the housing and not to the ferrule assembly).

The spring 107 is configured to urge against a collar portion 133 of the ferrule holder 132 and against the rear body 108 to urge the ferrule assembly 101 forward. Such springs are well known. If an integrally-molded housing is used, the spring 107 may be a square spring to conserve space.

It should be understood that in addition to the embodiments described above, many other embodiments are possible and within the scope of this invention.

What is claimed is:

1. A connector having a front and back orientation and comprising:
   a cable having at least a jacket and an optical fiber;
   a ferrule assembly comprising a rear portion for attachment to said jacket, and a ferrule defining a bore hole for containing said optical fiber;
   a housing having a front portion configured for mating with a mating structure and a back portion configured for attachment to a boot;
   a spring biasing said ferrule assembly forward in said housing; and
   a boot secured to said back portion of said housing and extending rearward around said tight-jacketed cable, said boot having an internal channel large enough to allow axial movement of said ferrule assembly relative to said boot.

2. The connector of claim 1, wherein said cable is a tight-jacketed cable.

3. The connector of claim 1, wherein said boot defines a first portion and a second portion, said first portion having a first diameter sized to snugly wrap around said back portion, said second portion having a second diameter smaller than said first diameter and being disposed loosely around said rear portion of said ferrule assembly.

4. The connector of claim 3, wherein said second portion extends rearward at least a certain distance beyond the back face of said rear portion when said connector is in an unmated state, said certain distance being the maximum distance said ferrule assembly is able to move rearward from its unmated state, whereby said second portion receives said rear portion when said ferrule assembly is pushed rearward.

5. The connector of claim 4, wherein said second portion extends from said first portion to the back end of said boot.

6. The connector of claim 4, wherein said boot defines a shoulder between said first and second diameters, said shoulder contacting a back face of said rear portion such that forward force applied to said boot is transferred to said rear portion.

7. The connector of claim 3, wherein said second portion is more flexible than said first portion.

8. The connector of claim 7, wherein said second portion has gaps and said first portion is solid.

9. The connector of claim 1, further comprising an elongated crimp member having a crimp eyelet portion crimped around said jacket and rear portion of said ferrule assembly to secure said jacket to said rear portion.

10. The connector of claim 9, wherein crimp member also comprises a sheathing portion, said internal channel has a minimum diameter larger than the outside diameter of said sheathing portion.

11. The connector of claim 10, wherein said minimum diameter is greater than 3 mm.

12. The connector of claim 9, wherein said internal channel is large enough such that said rear portion with said crimp member attached thereto moves rearward in said boot with an axial force less than the spring constant of said spring.

13. The connector of claim 12, wherein said axial force is about 5-6N.

14. The connector of claim 1, wherein said housing comprises a protrusion, said boot abutting said protrusion such that forward force applied to said boot is transferred to said housing through said protrusion.

15. The connector of claim 14, wherein housing comprises a latch, and said protrusion is said latch.

16. The connector of claim 1, wherein said housing is a small form factor housing.

17. The connector of claim 1, wherein said connector is a non-pull proof connector.

18. The connector of claim 17, wherein said connector is selected from the group consisting of LC or SC type connectors.

* * * * *